United States Patent

[11] 3,603,532

| | | |
|---|---|---|
| [72] | Inventor | Volker W. Harms<br>Mountain View, Calif. |
| [21] | Appl. No. | 819,898 |
| [22] | Filed | Apr. 28, 1969 |
| [45] | Patented | Sept. 7, 1971 |
| [73] | Assignee | The United States of America as represented by the Administrator of the National Aeronautics and Space Administration |

[54] APPARATUS FOR AUTOMATICALLY STABILIZING THE ATTITUDE OF A NONGUIDED VEHICLE
3 Claims, 8 Drawing Figs.

[52] U.S. Cl. .................................................. 244/3.21
[51] Int. Cl. ................................................ F42b 15/16
[50] Field of Search ........................................ 244/3.21; 102/3

[56] References Cited
UNITED STATES PATENTS

| | | | |
|---|---|---|---|
| 2,969,017 | 1/1961 | Kershner ..................... | 244/3.21 |
| 3,262,655 | 7/1966 | Gillespie, Jr. ................ | 244/3.21 X |

*Primary Examiner*—Verlin R. Pendegrass
*Attorneys*—Darrell G. Brekke and G. T. McCoy ABSTRACT: The attitude of a nonguided missile, or vehicle, is stabilized with its trajectory by a freely rotatable control surface on the vehicle that is prevented from aligning completely with the incident airstream due to a biasing spring. This results in any vehicle attitude deviation providing a moment to the vehicle that rotates it toward its desired attitude in line with the trajectory. Rapid damping of the vehicle attitude to be in line with its trajectory is accomplished by the control surface rotational movement back to its stable position lagging the rotational movement of the vehicle back to its desired attitude.

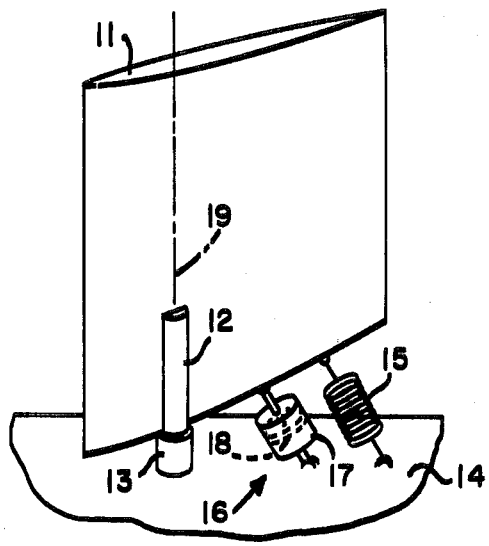
FIG. 1
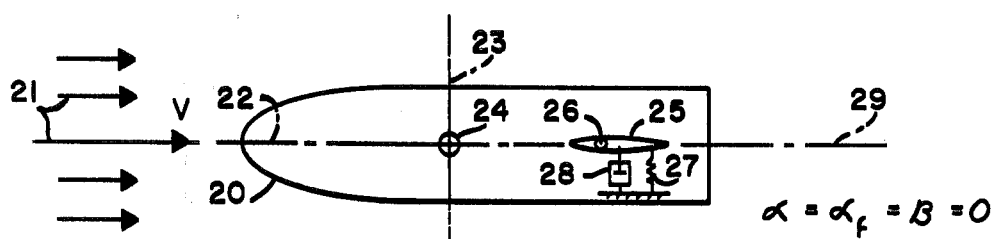
FIG. 2
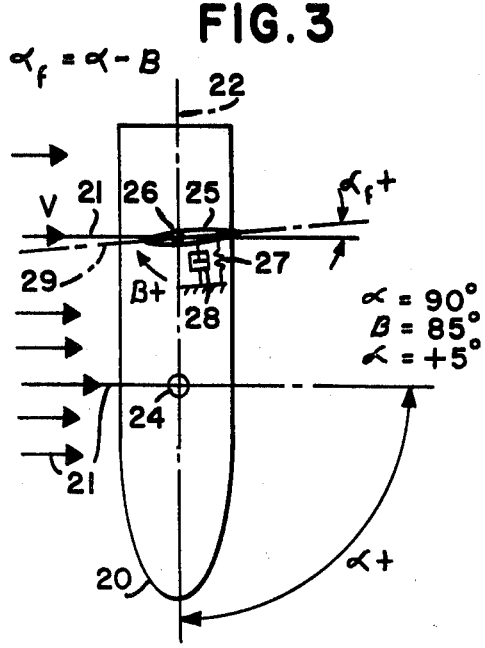
FIG. 3
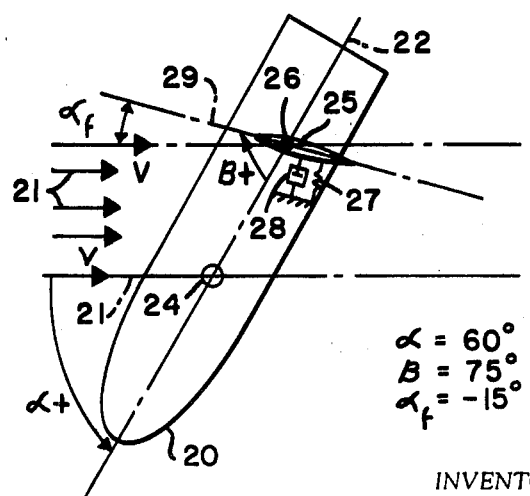
FIG. 4
INVENTOR.
VOLKER W. HARMS
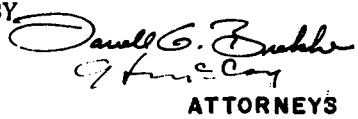
ATTORNEYS

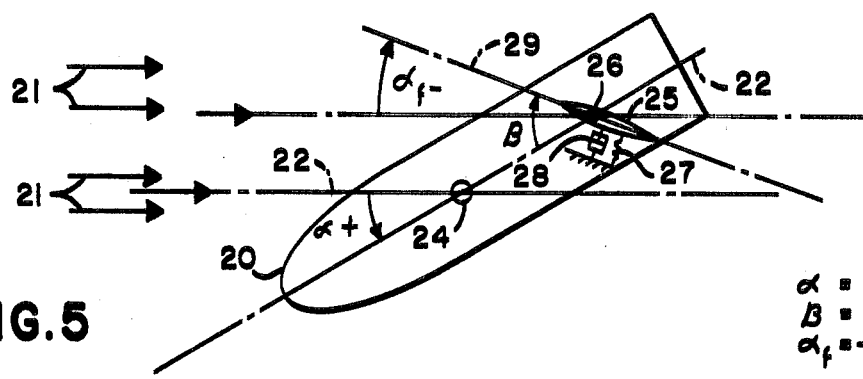
FIG.5
$\alpha = 30°$
$\beta = 50°$
$\alpha_f = -20°$
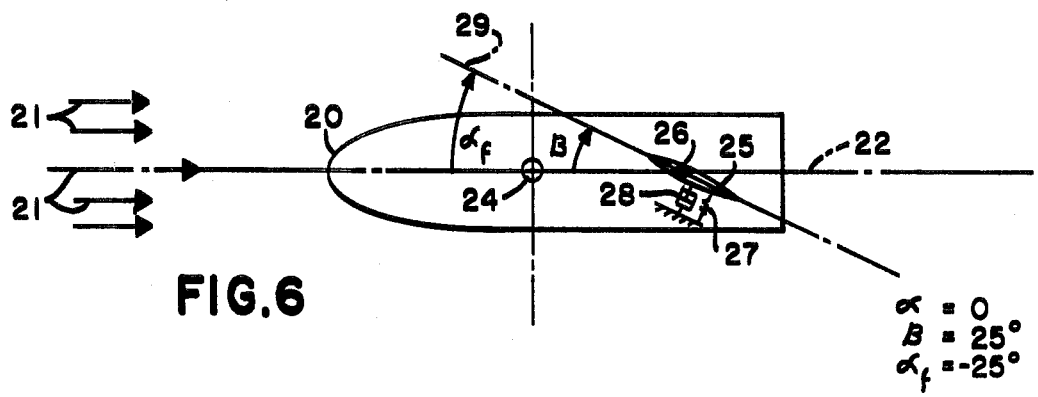
FIG.6
$\alpha = 0$
$\beta = 25°$
$\alpha_f = -25°$
FIG.7
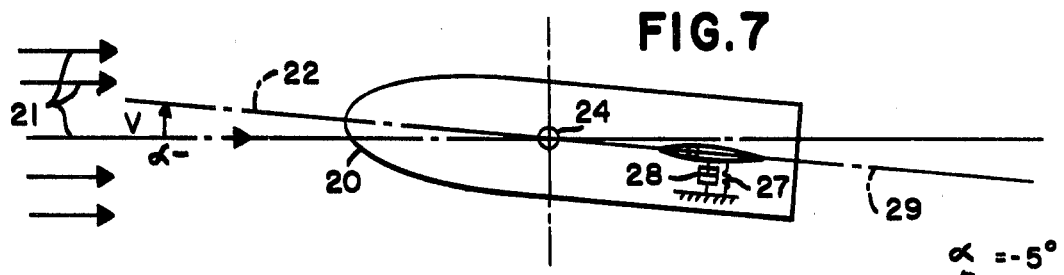
$\alpha = -5°$
$\beta = 0$
$\alpha_f = +5°$
FIG.8
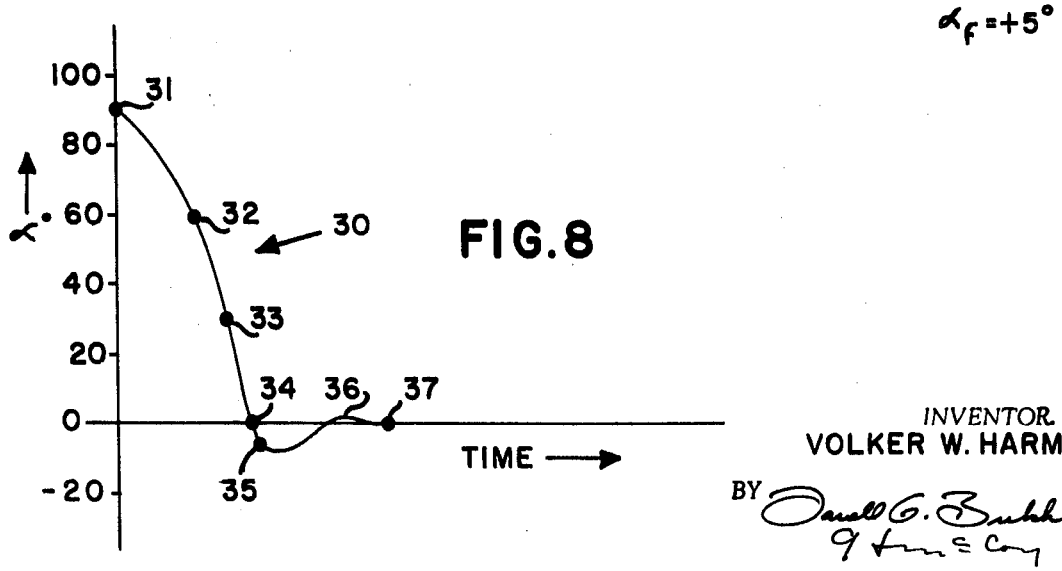
INVENTOR
VOLKER W. HARMS
ATTORNEYS

APPARATUS FOR AUTOMATICALLY STABILIZING THE ATTITUDE OF A NONGUIDED VEHICLE

The invention described herein was made by an employee of the United States Government and may be manufactured and used by or for the Government for Governmental purposes without the payment of any royalties thereon or therefor.

BACKGROUND OF THE INVENTION

This invention relates to stabilization of nonguided vehicles and more particularly to apparatus for automatically stabilizing the attitude of nonguided vehicles with their trajectory.

The attitude of nonguided vehicles, or missiles, is subject to change by large initial disturbances or gusts. The function of some vehicles is such that it is imperative to quickly bring the vehicle attitude in line with the vehicle trajectory. For example, vehicles, or missiles launched from a helicopter are subject to severe rotor down wash that can easily cause disturbances to the vehicle attitude. Since helicopters are used at relatively low altitudes, only a short time is available to correct the vehicle attitude before it strikes the ground. Also, nonguided vehicles are sometimes launched from aircraft in other than a straight ahead attitude. Many times it is very desirable that any disturbances to the attitude of such vehicles be rapidly corrected so that the vehicle attitude is in line with the vehicle trajectory.

SUMMARY OF THE INVENTION

A primary object of this invention is to provide simple and economical apparatus for rapidly stabilizing the attitude of a nonguided missile, or vehicle, subject to aerodynamic or hydrodynamic forces.

Briefly described, the present invention utilizes at least one freely rotatable control surface mounted on the vehicle. Any perturbation or other disturbance that changes the desired vehicle attitude causes the control surface to attempt to align itself with the airstream. Complete alignment, however, is prevented by a spring connected between the control surface and the vehicle. This incomplete alignment causes the incident airstream striking the control surface to impart a rotational moment to the vehicle that causes the vehicle to rotate toward its desired attitude. A one-way dashpot coupled between the control surface and the vehicle causes the control surface to return to its normal position at a slower rate than the vehicle is being rotated back to the desired attitude. This imparts a negative moment to the vehicle which results in the vehicle being rapidly stabilized, or damped, in its desired attitude which is in line with its trajectory.

BRIEF DESCRIPTION OF THE DRAWINGS

These and other features, objects and advantages of this invention will be apparent from consideration of the following detailed description taken conjunction with the annexed drawings in which like reference characters designate like or corresponding parts throughout the several views and wherein:

FIG. 1 is a schematic illustration of a control surface adapted to function in accordance with this invention;

FIGS. 2 through 7 illustrate various attitudes of a nonguided vehicle being returned to an attitude in line with its trajectory by the apparatus of this invention; and FIG. 8 is a graph which illustrates the vehicle attitude damping characteristics of this invention.

DESCRIPTION OF THE PREFERRED EMBODIMENT

Referring now to FIG. 1, a preferred embodiment of this invention is shown as including a rigid body 14 which may comprise the body of a nonguided missile or vehicle. Also, the rigid body 14 may comprise a portion of a rigid control fin, wing, or the like which is immovably secured to the body of the nonguided vehicle. A control surface 11 is secured to a split shaft 12 that is rotatably mounted to the body 14 by means of a cylindrical member 13. The shaft 12 may be rotatably secured to the body 14 by any number of well-known means. The control surface 11 is secured to the shaft 12 such that the rotational axis 19 of the control surface is about a longitudinal axis near the quarter chord line of the control surface 11 as shown. The stable position of the control surface 11 corresponds to the plane defined by its surface being in line with the longitudinal axis of the vehicle to which it is secured. However, with the rotational axis 19 of the control surface 11 so located, the control surface will tend to align itself with the local airstream in a manner similar to that of a weather vane. When the control surface is rotated from its stable position, a biasing device, such as a spring 15 connected between the body 14 and the control surface 11, prevents the control surface 11 from completely aligning with the local airstream. Accordingly, the local airstream striking the incident angle of the control surface 11 causes the control surface 11 to impart some moment to the vehicle, or missile, to which it is attached.

A viscous damper, such as a one-way dashpot 16, is connected between the control surface 11 and the body 14. Typically this damper includes a piston 18 operating within a cylinder 17. The operation of this well-known device is such that the damper 16 offers little or no resistance to the rotation of the control surface 11 away from its stable position. However, the damper resists rotation of the control surface 11 back toward its stable position. This resistance, or damping is such that the rotational movement imparted to the nonguided vehicle by the control surface not being in its stable position is greater than the rate the damper 16 allows the control surface to be returned to its stable position by the spring 16 and/or local airstream. In other words, as the control surface 11 and nonguided vehicle to which it is attached return from an angular displacement (or attitude change caused by a perturbation or the like) to their stable positions, the rate of return of the control surface as determined by the damper 16 is so matched to that of the nonguided vehicle to which it is attached that the control surface 11 consistently lags the rotational motion of the vehicle. This one-way damping significantly dampens the rotary motion of the nonguided vehicle to rapidly stabilize the vehicle attitude with its trajectory as further described hereinbelow.

FIG. 1 illustrates only a single control surface 11. However, as will be apparent to those skilled in the art, more than one such control surface may be advantageously used with a nonguided vehicle. Also, FIG. 1 shows only one spring 15 and one damper 16 associated with the control surface 11. However, more than one of these devices may be used in conjunction with a control surface 11 to obtain the functions described above.

Briefly, the operation of the device of FIG. 2 is such that when the attitude of the vehicle to which it is attached is in line with the trajectory imparted to the vehicle, the plane of the control surface is in line with the longitudinal axis of the nonguided vehicle and both the vehicle and the control surface 11 are in their stable position. If, due to some perturbation in the flow field, a gust, or some arbitrary vehicle rotation, the attitude of the vehicle is no longer in alignment with its trajectory, the freely rotatable control surface 11 tends to align itself with the new incident airstream with such alignment not being complete due to the spring 15. The airstream striking the control surface 11 causes a restoring moment to be applied to the vehicle causing it to move toward its original position. The damper 16 ensures that the rate of return of the control surface 11 to its stable position is less than the rate of return of the nonguided vehicle to its stable position. This results in the control surface 11 having an opposite angle of attack to the airstream thereby producing a moment on the vehicle that acts in the opposite direction to the direction the vehicle is now being moved in order to reach its stable position. This opposite moment tends to cancel the vehicle inertia moment and effectively and rapidly stabilizes, or dampens, the vehicle attitude to be in line with its trajectory.

As the control surface 11 rotates to within a predetermined angle with the longitudinal axis of the nonguided vehicle, the control surface 11 enters a region which forces it into complete alignment with the longitudinal axis of the vehicle and from which it is mechanically prevented from moving unless the attitude of the vehicle with relation to its trajectory exceeds this predetermined angle. In an exemplary embodiment of this invention, this predetermined angle was about 5° This angle assures that the control surface 11 acts as a rigid control surface as long as the angle of attack of the nonguided vehicle with the airstream does not exceed this angle. This is accomplished in an exemplary embodiment by a spring loaded detent arrangement, but could be accomplished by any one of various known biased locking devices.

This invention will be more clearly understood from consideration of FIG. 8, which shows a curve 30 plotted for degrees variation of vehicle attitude from vehicle trajectory versus time that illustrates the stabilizing characteristics of this invention, and FIGS. 2 through 7 which illustrate various vehicle attitudes for various points along the graph of FIG. 8.

Referring now to FIG. 2, there is shown a nonguided vehicle 20 having a freely rotatable control surface 25 mounted thereon. The control surface 25 has a rotational axis 26 as described above. Also, in a manner as described above, a one-way damper 28 and a spring 27 are connected between the control surface 25 and the vehicle 20. Assume now that a trajectory going from right to left has been imparted to the vehicle 20. The relative velocity between the vehicle and surrounding air is schematically illustrated by the arrows 21. Further, the vehicle 20 has a center of gravity 24 located along its longitudinal axis 22 defined by the intersection of the longitudinal axis 22 with a line 23 perpendicular therewith. The axis or rotation 26 of the control surface 25 is located behind the center of gravity 24 of the vehicle, along the longitudinal axis 22 of the vehicle and perpendicular therewith. For purposes of simplicity and clarity, only one control surface 25 is illustrated in FIGS. 2 through 7. As will be apparent to those skilled in the art, more than one such control surface can advantageously be used with a nonguided vehicle 20.

As shown by FIG. 2, when the attitude of the vehicle 20 is in line with its trajectory, the plane 29 defined by the control surface 25 is in line with the longitudinal axis 22 of the vehicle. Assume that as a result of some perturbation, the attitude of the vehicle 20 is 90° out of line with its trajectory as shown by FIG. 3. For this condition, which corresponds to point 31 on the curve 30 of FIG. 8, the longitudinal axis 22 of tee vehicle 20 makes an angle $x$ of 90° with its trajectory. The freely rotatable control surface tends to align itself with the airstream 21. However, due to the spring 27, the control surface 25 cannot fully align with the airstream 21 thereby making an angle $\alpha_f$ of about +5° with the airstream 21 and an angle $\beta$ of about 85° with the longitudinal axis 22 of the vehicle 20. The angle of attack of the control surface with the airstream produces a moment on the vehicle 20 that causes it to rotate clockwise around its center of gravity 24 back toward its stable position of its attitude being in line with its trajectory.

Due to the moment thus produced on the vehicle 20, the vehicle attitude decreases to 60° out of line with its trajectory as shown by FIG. 4. For this condition, which corresponds to point 32 on the curve 30 of FIG. 8, the vehicle has rotated 30° toward its trajectory. However, due to the one-way damper 28, the control surface 25 has rotated 10° closer to its stable position in which its plane 29 is in line with the longitudinal axis 22 of the vehicle 20. This causes the control surface 25 to have an angle of attack $\alpha_f$ with respect to the airstream 21 of about −15° and an angle $\beta$ of about 75° with respect to the longitudinal axis of the vehicle. This negative angle of attack $\alpha_f$ causes the control surface 25 to produce a counterclockwise moment on the vehicle which opposes the clockwise vehicle inertia moment previously produced by the control surface 25 as discussed above in conjunction with FIG. 3.

This opposite moment does not completely cancel the vehicle 20 inertia moment and vehicle attitude continues toward alignment with its trajectory. FIG. 5 shows the vehicle attitude decreasing to 30° out of line with the trajectory. This corresponds to point 33 on the curve 30 of FIG. 8. As shown by FIG. 5, the angle $\alpha_f$ of attack of the control surface 25 with the airstream 21 is now caused by the damper 28 to be about −20° and the surface 25 makes an angle $\beta$ of about 50° with the vehicle 20 axis 22. It will now be apparent that as the vehicle inertia moment causes the vehicle to be closer to alignment with its trajectory, the opposing moment produced by the negative angle $\alpha_f$ of attack of the control surface 25 with the airstream 21 increases in attempt to have the vehicle completely stop rotating when its attitude is in line with its trajectory. At the same time the angle $\beta$ between the control surface 25 and the longitudinal axis 22 of the vehicle 20 is decreasing.

When the clockwise vehicle inertia moment causes the vehicle attitude to be in line with its trajectory as shown by FIG. 6, and corresponding to point 34 on the curve 30 of FIG. 8, the control surface 25 now has an even greater angle $\alpha_f$ of attack with respect to the airstream of about −25° but an angle $\beta$ of only 25° with respect to the longitudinal axis 22 of the vehicle 20. At this point the vehicle 20 inertia moment is still causing the vehicle to rotate clockwise around its center of gravity 24. This however, is opposed by an increasing moment in the opposite direction produced by the negative angle $\alpha_f$ of attack of the control surface 25 with the airstream 21. This opposing moment, however, does not completely stop further rotation of the vehicle 20 and, as a result, the vehicle 20 overshoots its stable position (where its attitude is in line with its trajectory) by about 5° in the typical embodiment, as shown by FIG. 7. This corresponds to point 35 on the curve 30 of FIG. 8.

Now the angle $\beta$ between the control surface 25 and the longitudinal axis 22 of the vehicle 20 is only about 5°, the control surface will now align itself with the longitudinal axis 22 of the vehicle as shown in FIG. 7, and described above in detail, to become a rigid fin. The fin is rigid below the crossover angle and floats above it. Reference to FIGS. 7 and 8 will show that this alignment of the control surface 25 causes the airstream 21 striking the control surface 25 to produce a counterclockwise moment on the vehicle 20 which moves it back toward its stable position, the clockwise rotation having been stopped. As shown by the portion of the curve 30 of FIG. 8 indicated by the reference character 36, this may again cause the vehicle to slightly overshoot its stable position. However, as will be clear from a perusal of FIG. 7, any such overshoot will be counteracted by the now rigid control surface 25 which results in the vehicle becoming stabilized with its attitude (and longitudinal axis 22) in line with its trajectory as shown in FIG. 2 and the point 37 on the curve 30 of FIG. 8.

The control surface 25 functions described above cause the nonguided vehicle 20 to have any attitude variations from its trajectory to be rapidly damped, or stabilized. Although the embodiment described above in conjunction with FIGS. 1 through 8 is an aerodynamic vehicle, it will be clear to those skilled in the art that the present invention would perform equally well with a nonguided hydrodynamic vehicle.

What is claimed is:

1. Apparatus for automatically stabilizing the attitude of a nonguided body with its flight trajectory comprising:

at least one control surface rotatably mounted on said body, resilient biasing means coupled between said body and said control surface, said control surface adapted to align itself with the airstream produced by the trajectory of said body and when the attitude of said body is not in line with its trajectory then such alignment being incomplete due to said biasing means to provide a restoring moment on said body, one-way damping means coupled between said body and said control surface to dampen the movement of said control surface toward alignment with the longitudinal axis of said body, and means coupled to said control surface and said body to prevent the rotation of said control surface unless the attitude of said body is out of line with its trajectory by a predetermined amount.

2. Apparatus for stabilizing the attitude of a nonguided vehicle with its trajectory comprising:
- a vehicle having astable position when its attitude is in line with its trajectory,
- a rotatable control surface having a stable position when it is in line with the longitudinal axis of said vehicle,
- a spring coupled between said vehicle and said control surface,
- a damper coupled between said vehicle and said control surface,
- deviations of said vehicle attitude from said trajectory causing the control surface to be rotatable in one direction by the airstream and rotatable in the opposite direction by said spring such that the alignment of the control surface with the airstream is incomplete to impart a restoring moment to said vehicle,
- said damper causing the control surface to lag the rotational movement of said vehicle back to its stable position such that the attitude of the vehicle is stabilized with its trajectory, and
- means coupled to said control surface and adapted to prevent the control surface from rotating unless the angle of attack of said vehicle with respect to the airstream exceeds a predetermined amount.

3. Apparatus for stabilizing the attitude of a nonguided vehicle with its trajectory comprising:
- a vehicle having a stable position when its attitude is in line with its trajectory,
- a rotatable control surface having a stable position when it is in line with the longitudinal axis of said vehicle,
- a spring coupled between said vehicle and said control surface,
- a damper coupled between said vehicle and said control surface,
- said damper including a one-way dashpot,
- deviations of said vehicle attitude from said trajectory causing the control surface to be rotatable in one direction by the airstream and rotatable in the opposite direction by said spring such that the alignment of the control surface with the airstream is incomplete to impart a restoring moment to said vehicle,
- said damper causing the control surface to lag the rotational movement of said vehicle back to its stable position such that the attitude of the vehicle is stabilized with its trajectory, and
- means coupled to said control surface and adapted to prevent the control surface from rotating unless the angle of attack of said vehicle with respect to the airstream exceeds a predetermined amount.